3,192,628
NON-CONTACT CONTOUR TRACER
Arthur J. Wroble and John E. Taylor, Mount Clemens, Mich., and Hans E. Liebert, Rochester, N.Y., assignors to Ex-Cell-O Corporation, Detroit, Mich., a corporation of Michigan
Filed Dec. 11, 1961, Ser. No. 158,496
1 Claim. (Cl. 33—23)

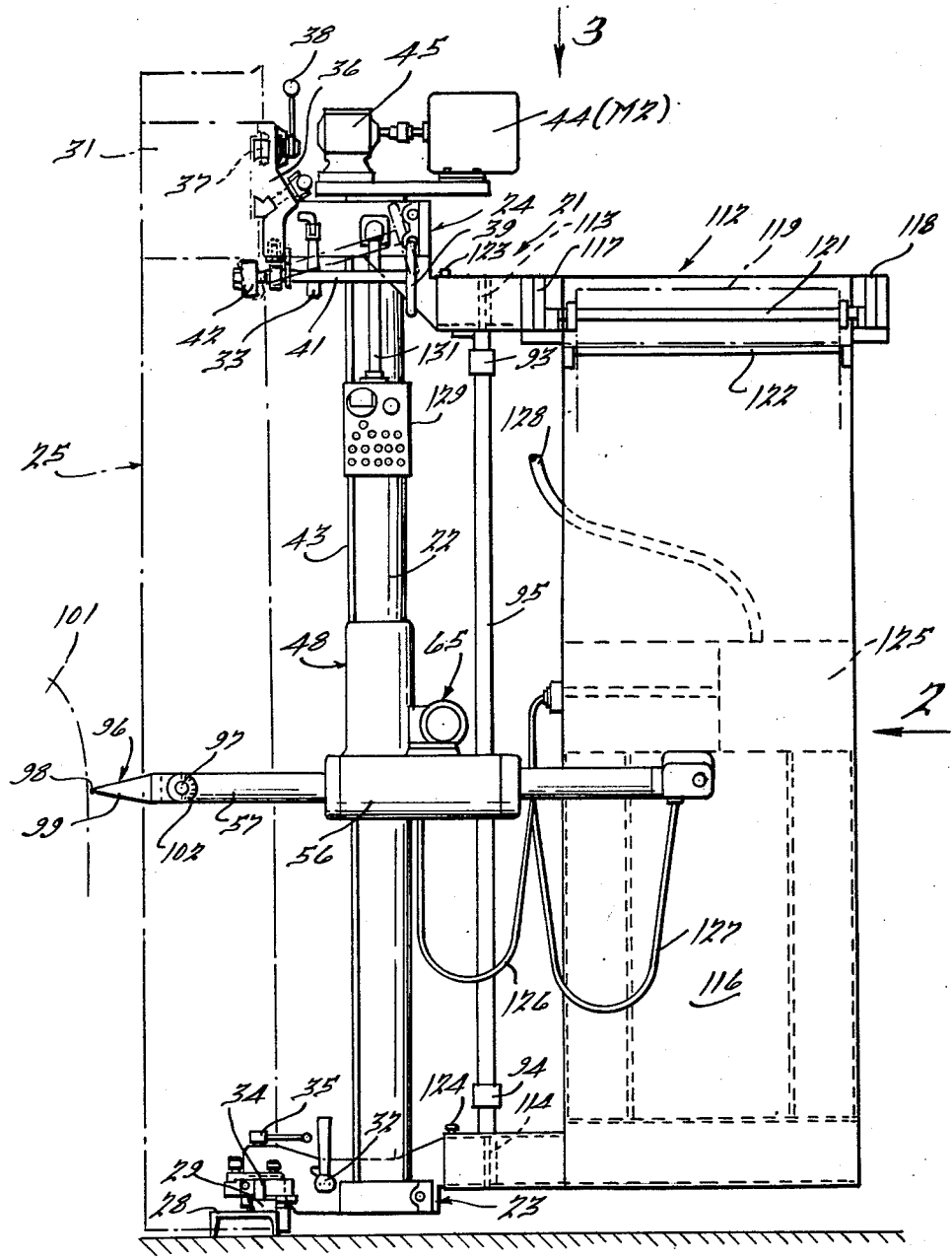

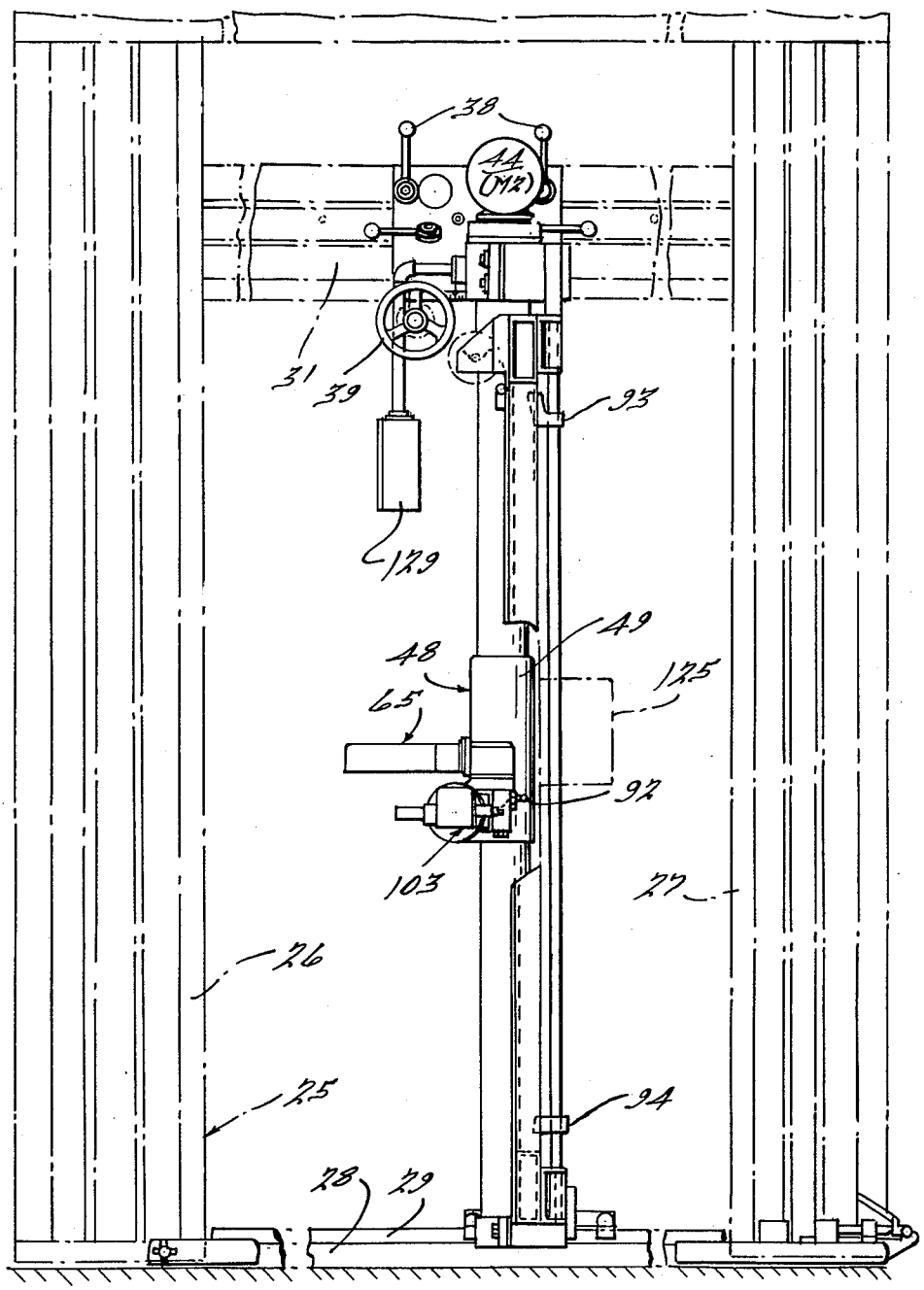

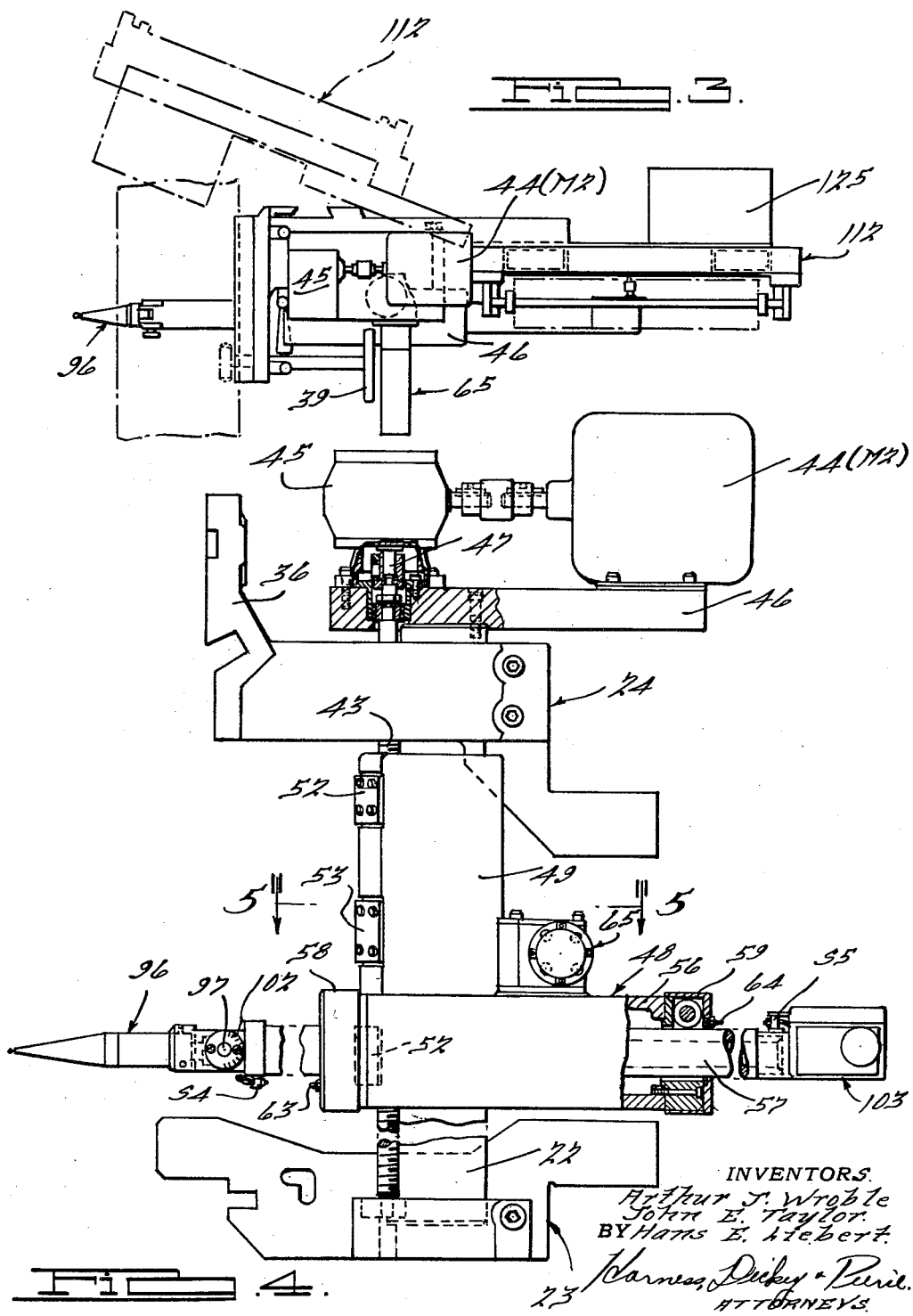

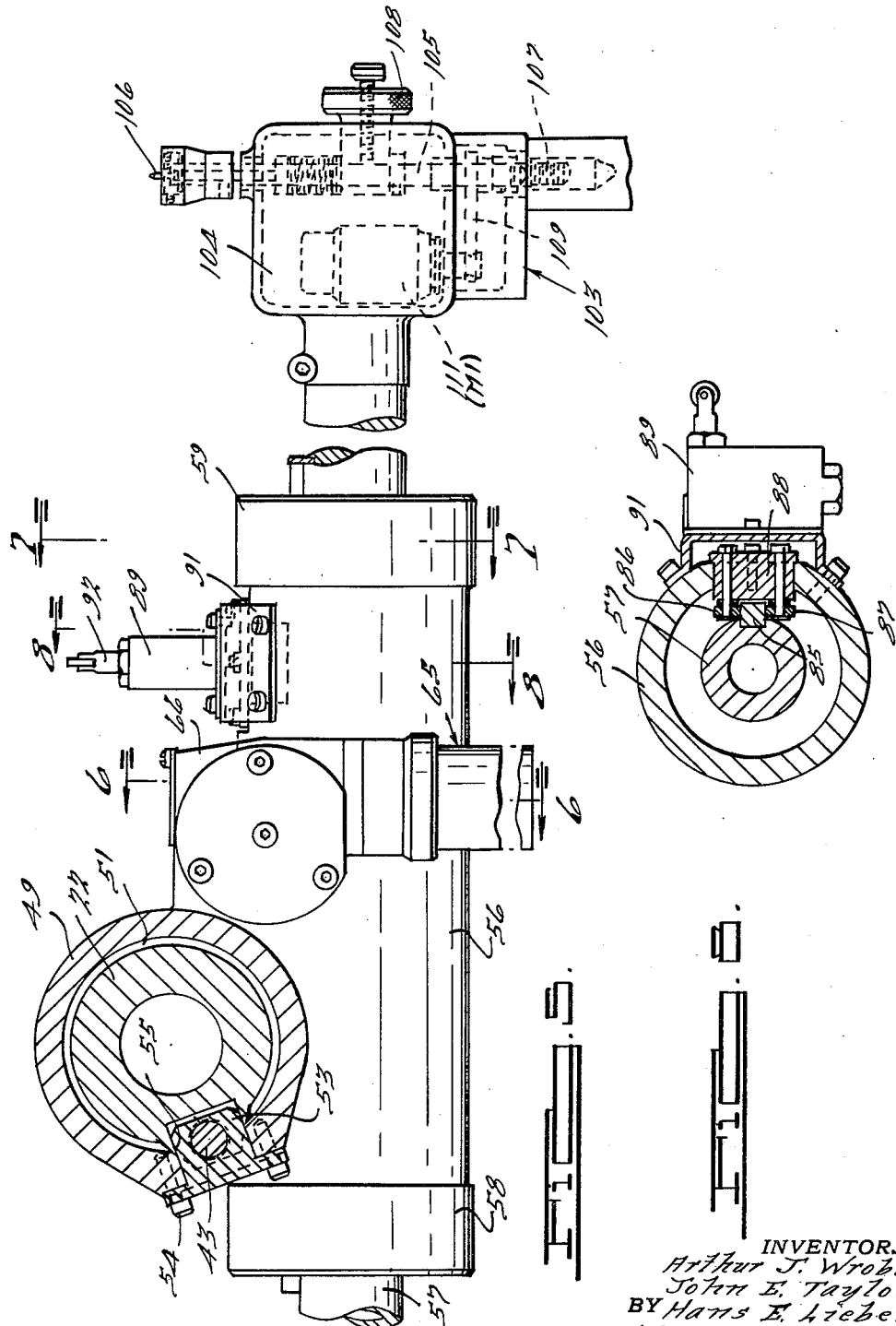

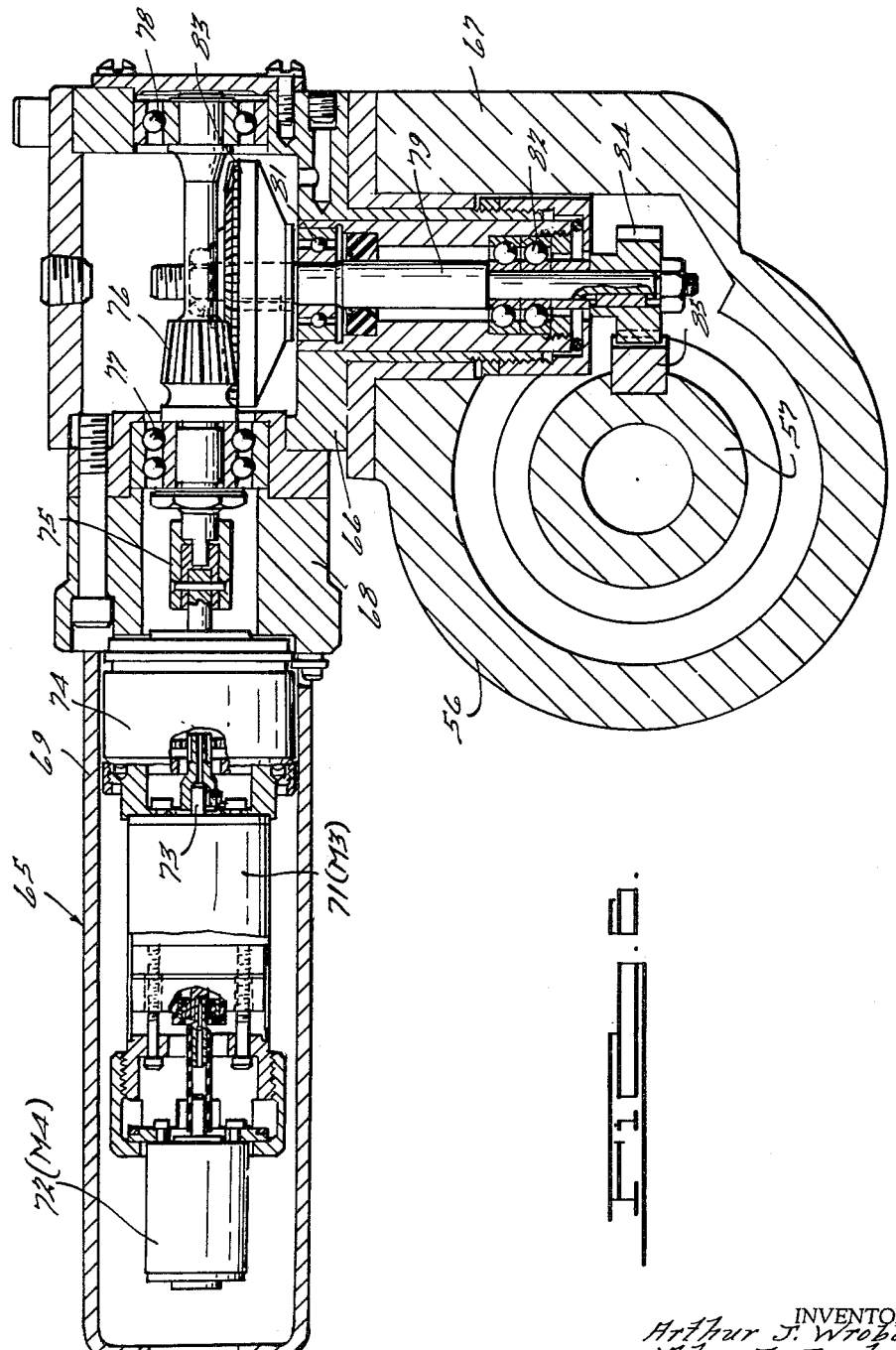

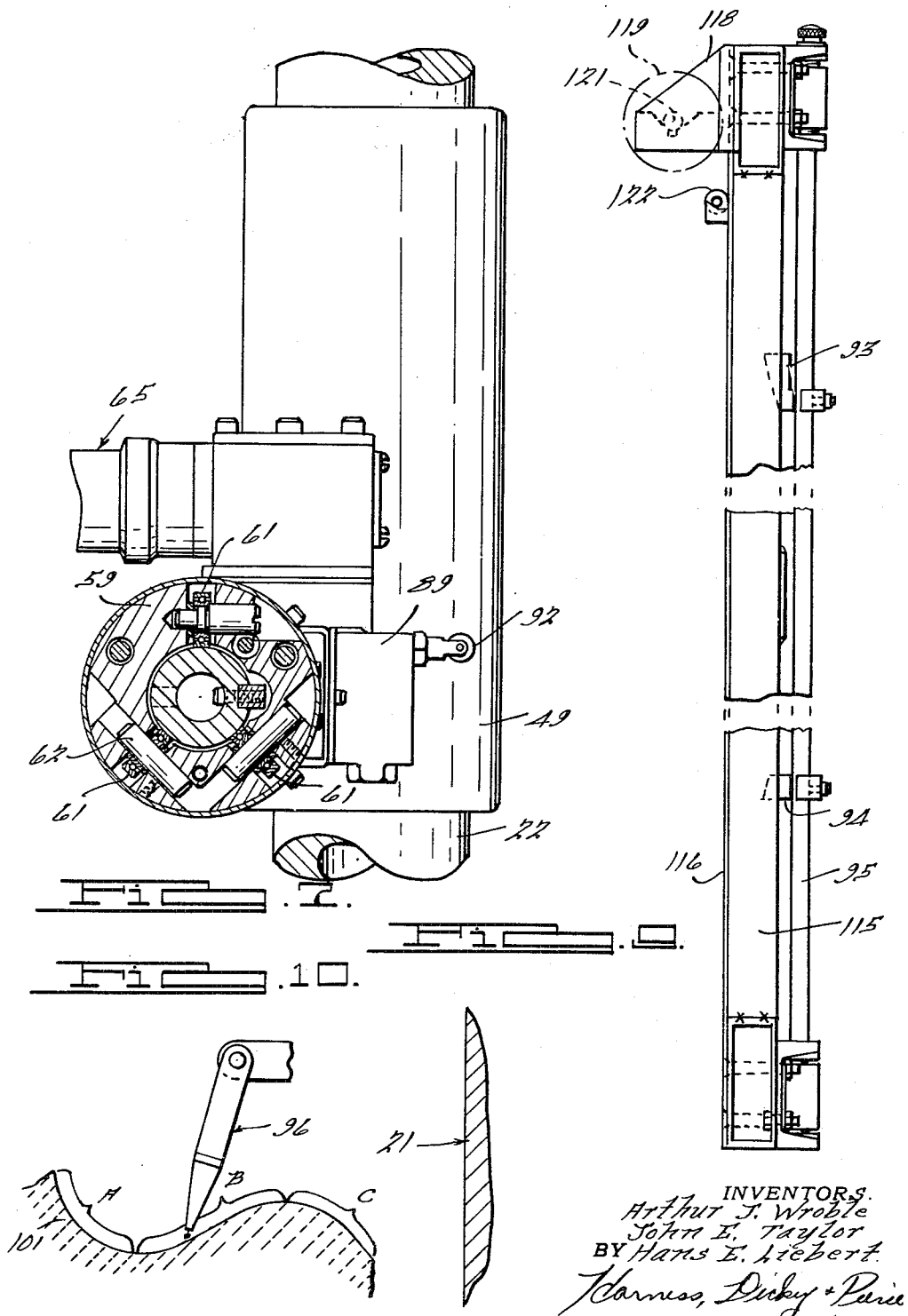

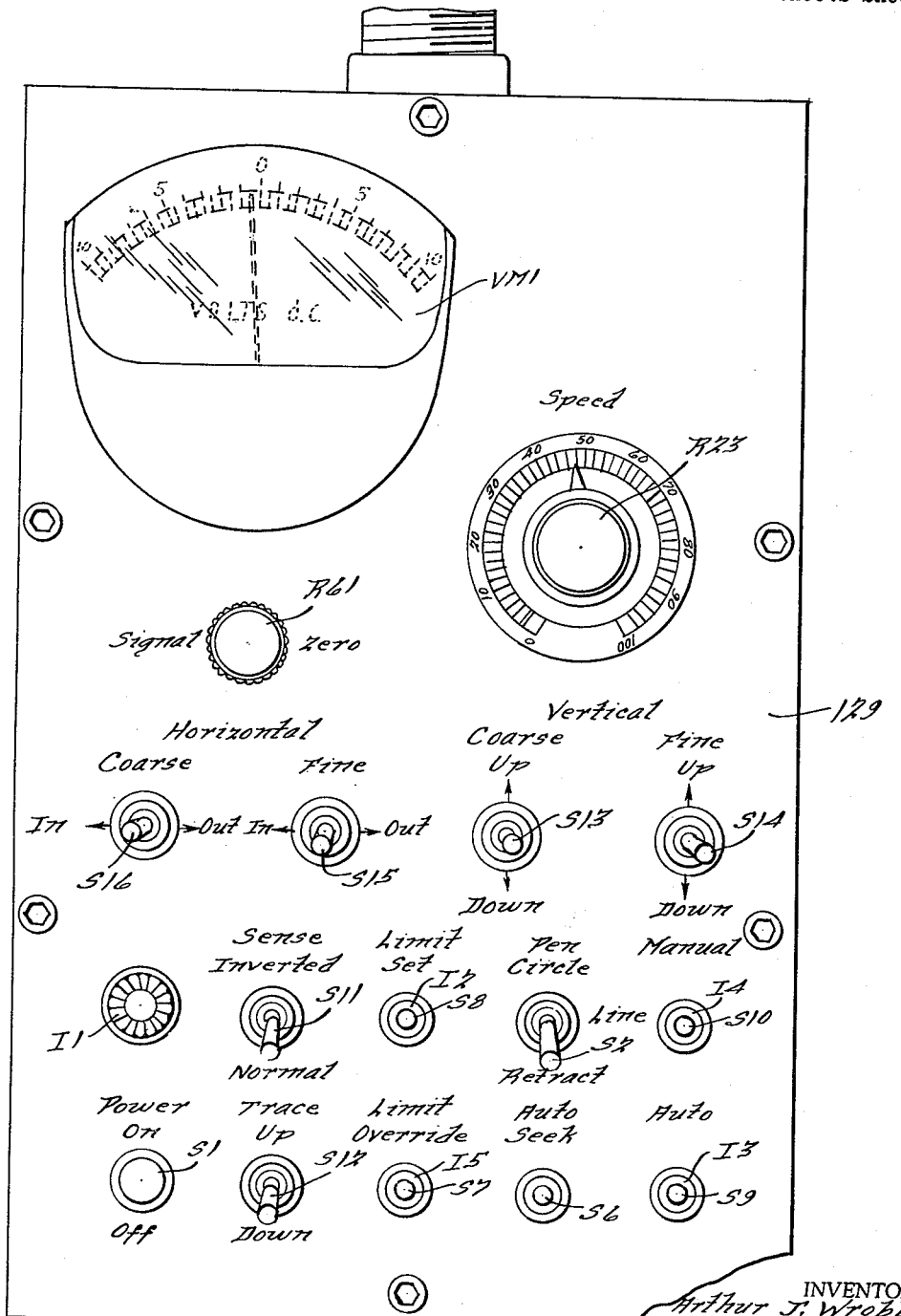

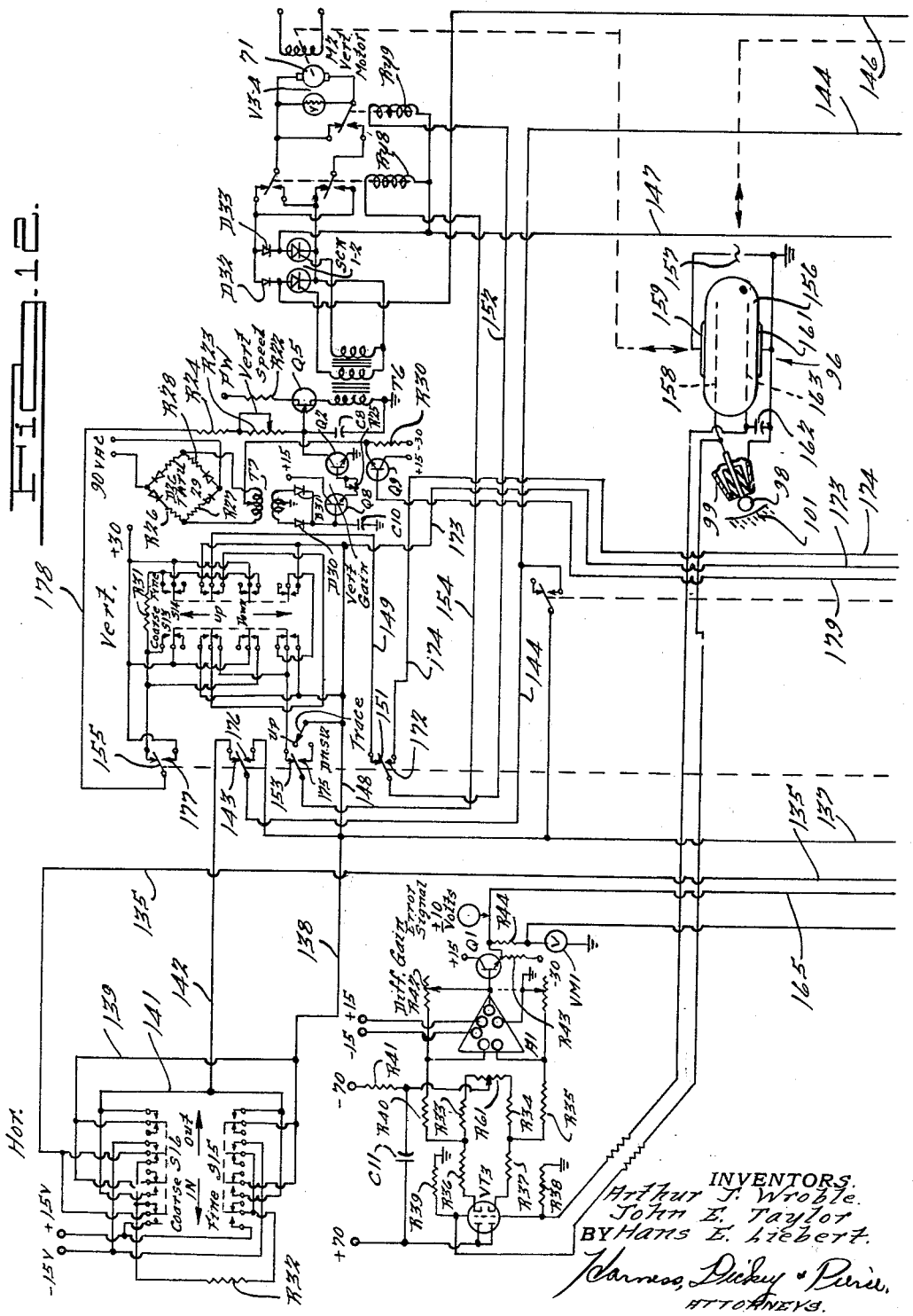

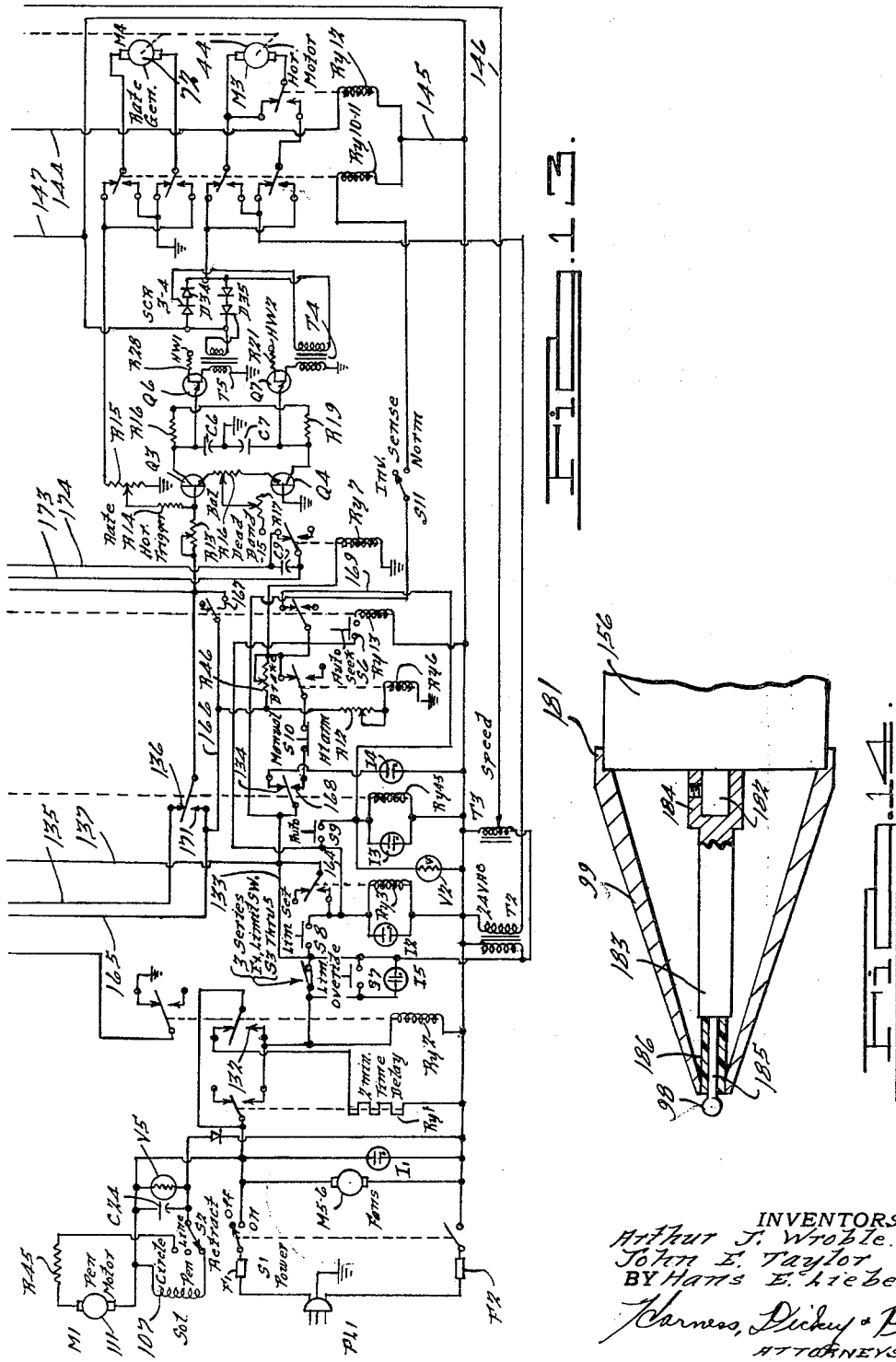

This invention relates to non-contact contour tracers, and more particularly to devices for duplicating sections of curved surfaces such as side and end sections of clay model automobile bodies.

It is an object of the present invention to provide a novel and improved non-contact contour tracer which is capable of tracing curved sections with a very high degree of accuracy, even when the curvatures or discontinuities are quite sharp.

It is a further object to provide an improved contour tracer of this nature which is adapted for use in conjunction with a mounting structure such as a styling bridge used in automotive and other design establishments.

It is another object to provide an improved transcriber of the above nature which eliminates the need for two servomotors, but utilizes a single servomotor for one direction of movement and a variable speed motor for the other direction, with speed control means between the error signal for the servomotor and the variable speed motor.

It is also an object to provide an improved tracer of the above character which includes means for preventing engagement of the probe with the part being traced regardless of the presence of sudden discontinuities.

It is another object to provide an improved device of this nature which is capable of tracing re-entrant or inverse curves in a continuous manner with very little control manipulation being required.

It is a further object to provide an improved tracing mechanism having the above characteristics, in which the probe may be caused to rapidly approach the part to be traced, and will automatically adjust itself to the correct gap.

It is a further object to provide an improved contour tracer of this nature which is adapted to record the contour in the form of a straight line, a continuous spiral or in other forms.

Other objects, features, and advantages of the present invention will become apparent from the subsequent description taken in conjunction with the accompanying drawings, in which:

FIGURE 1 is an overall side elevational view of a preferred embodiment of the non-contact contour tracer of this invention, showing the unit mounted on horizontal cross rails between the columns of a styling bridge;

FIGURE 2 is a rear elevational view of the unit taken in the direction of the arrow 2 of FIGURE 1, parts being broken away;

FIGURE 3 is a top plan view of the unit taken in the direction of the arrow 3 of FIGURE 1;

FIGURE 4 is an enlarged fragmentary side elevational view, with parts broken away, of the vertical column, showing the upper and lower bracket assemblies and the horizontal cross arm assembly;

FIGURE 5 is a plan cross-sectional view taken along the line 5—5 of FIGURE 4 and showing the manner in which the horizontal cross arm assembly is mounted on the vertical column and driven by the feed screw carried by said column;

FIGURE 6 is a cross-sectional view in elevation taken along the line 6—6 of FIGURE 5 and showing the connection between the servomotor and the horizontal cross arm;

FIGURE 7 is a cross-sectional view in elevation taken along the line 7—7 of FIGURE 5 and showing the bearing supports for the horizontal cross arm;

FIGURE 8 is a cross-sectional view taken along the line 8—8 of FIGURE 5 and showing the bearing supports for the rack carried by the horizontal cross arm;

FIGURE 9 is an enlarged end elevational view of the easel and limit switch actuator supporting rod, looking in the same direction as FIGURE 2;

FIGURE 10 is a diagrammatic view showing the manner in which the tracer may be used for inverse curves;

FIGURE 11 is a front view of the control panel;

FIGURE 12 is a portion of an electrical circuit diagram of the unit;

FIGURE 13 is another portion of the electrical circuit diagram, to be read in conjunction with FIGURE 12 by aligning it below FIGURE 12; and FIGURE 14 is a partially schematic cross-sectional view of a portion of the probe assembly, showing the manner of supporting the probe within its shield.

In general terms, the illustrated embodiment of the invention comprises a vertical column adapted to be stationarily mounted, or mounted for adjustment in a horizontal direction. A horizontal cross arm is mounted on the column, a variable speed motor being provided for moving the horizontal cross arm in a vertical direction. One end of the cross arm carries a probe of a known type having a transducer for sensing changes in capacitance, as determined by the distance of the probe from a surface such as the clay surface of an automotive model. The other end of the cross arm carries a tracing element, and an easel is carried by the vertical column so that the tracing element may mark the contour followed by the probe as the cross arm is fed in a vertical direction.

The unit may be placed in a manual mode for preadjusting the gap, motor speed and limit switches, and means are provided for quickly returning the probe to this gap once it is set. When the unit is placed in its automatic mode, the variable speed motor drives the cross arm in one direction vertically at a normally constant rate of speed, while a servomotor responsive to the probe transducer shifts the cross arm back and forth horizontally so as to maintain the gap between the probe and work at a substantially constant value. This shifting is in response to an error signal from the transducer, the speed of the servomotor being proportional to the magnitude of the error signal and the direction dependent upon its positive or negative polarity. The power supplied to the variable speed mootor will also decrease proportionally to the magnitude of the error signal. Should the curvature be so sharp that the servomotor reaches its maximum speed and the gap variation is still increasing, the variable speed motor will momentarily stop, halting the vertical movement of the cross arm. A still further increase in the error signal will take the machine completely out of its automatic mode and return it to the manual mode. Through a suitable limit switch control, the vertical movement of the tracing action may be stopped at any desired point on the contour, or at the end of the trace, returning the unit to its manual mode.

The electrical circuitry provides means for coarse and fine manual positioning in both horizontal and vertical directions. As stated above, means are also provided for rapidly positioning the probe adjacent the work with the desired gap, once this gap has been properly selected. Safety means are further provided for preventing transfer of the machine from its manual to its automatic mode if the limit positions have not been properly adjusted or the gap has not been established.

The probe is pivotally mounted on the horizontal cross arm for adjustment into any preselected position about a horizontal axis. In cases where an inverse or re-entrant curve is being traced, means are provided for correspondingly inverting the sense of operation of the unit so that a continuous trace of the contour may be achieved.

Referring more particularly to the drawings, the entire unit is generally indicated at 21 and comprises a vertical column 22 of tubular construction, to which is attached a lower bracket assembly generally indicated at 23 and an upper bracket assembly generally indicated at 24. The two bracket assemblies are mountable on a styling bridge shown in dot-dash lines in FIGURES 1 and 2 and generally indicated at 25. The styling bridge is a framework generally used by automotive and other industrial designers, and includes a pair of vertical columns 26 and 27 connected by a surface plate 28 on which rests a lower cross rail assembly 29, and an upper horizontal cross slide beam 31.

Bracket assemblies 23 and 24 are adapted by clamping means indicated partially at 32 and 33 respectively to be attached to either vertical column of the styling bridge, but are shown as being supported by lower cross rail assembly 29 and horizontal cross slide beam 31. It will be understood that unit 11 could be adapted for mounting on other types of supports within the principles of the invention.

Lower bracket assembly 23 is of generally elongated shape, and a roller carriage assembly 34 is secured to one end thereof, this roller carriage assembly engaging cross rail assembly 29 and being movable therealong. Means indicated at 35 are provided for locking the roller carriage assembly to the lower cross rail assembly during a transcribing operation. Roller carriage assembly 34 thus serves to support the weight of transcriber 21 and allows the transcriber to be positioned laterally between the styling bridge vertical columns 26 and 27.

Upper bracket assembly 24 is likewise of generally elongated shape, and has a portion 36 with a dovetail shape adapted to fit a corresponding dovetail construction found on horizontal cross slide beam 31 of the styling bridge. Rollers indicated partially at 37 permit the entire unit 21 to roll on lower cross rail assembly 29 and cross slide beam 31, and clamping means 38 are provided on portion 36 of upper bracket assembly 24 to lock the unit in position. Suitable indicators (not shown) and scales may be provided at the lower and upper bracket assemblies for assuring true perpendicular positioning of the transcriber. A hand wheel 39 carried by a shaft 41 is rotatably and rockably supported by upper bracket assembly 24, the shaft carrying a friction wheel 42 engageable with cross slide beam 31 for fine positioning of the unit.

A lead screw 43 extends the entire length of vertical column 22 along one side thereof as seen in FIGURE 5, and a reversible variable speed motor 44 (also referred to as M2 in the description of the electrical circuitry) is mounted on upper bracket assembly 24 and serves to rotate screw 43 in either direction through a gearbox 45. Motor 44 and gearbox 45 are mounted on a platform 46 secured to upper bracket assembly 24, as seen in FIGURE 4, the output shaft 47 of gearbox 45 driving lead screw 43.

A horizontal cross arm assembly generally indicated at 48 is guided for vertical movement on column 22 by means of a bearing support 49 forming part of assembly 48 and surrounding column 22, as seen in FIGURE 5. Bearing support 49 has a plurality of sleeve bearings 51 engageable with column 22, and a pair of keys 52 as well as a nut 53 are secured to one side of support 49 by fasteners 54. Nut 53 is threadably engageable with screw 43, and the nut and keys are slidable in a keyway 55 formed in column 22 and receiving screw 43, the keyway thus preventing rotation of horizontal cross arm assembly 48 on column 22. Keys 52 have clearance apertures for screw 43.

A cross arm supporting sleeve 56 is secured to the lower portion of support 49 and extends transversely thereto, as seen in FIGURE 4. A horizontal cross arm 57 is disposed within sleeve 56 and is supported for axial movement therein by two similar sets of ball bearing roller assemblies 58 and 59 carried by the opposite ends of sleeve 56. The construction of ball bearing roller assembly 59 is seen in FIGURE 7, this assembly including three ball bearing rollers 61 spaced 120° apart and carried by shafts 62.

Cross arm 57 is substantially longer than sleeve 56, and limit switches S4 and S5 also (see FIGURE 12) are mounted adjacent opposite ends of cross arm 57, as seen in FIGURE 4, these normally closed switches being engageable with stops 63 and 64 respectively carried by sleeve 56. A servomotor assembly generally indicated at 65 is mounted on cross arm assembly 48 and has means for driving cross arm 57 in either axial direction. This driving means is best seen in FIGURE 6, servomotor assembly 65 being supported by a bracket 66 secured to an extension 67 at the midportion of sleeve 56. A motor supporting bracket 68 is secured to one side of bracket 66 above sleeve 56, and an elongated motor housing 69 is secured to one side of bracket 68. A servomotor 71 and a rate generator 72 (also referred to as M3 and M4 respectively in the electrical circuitry description) are disposed within housing 69, and the output shaft 73 of motor 71 is connected to a reduction gear assembly 74 within housing 69. The output of gearing 74 is connected by a coupling 75 within bracket 68 to a bevel pinion 76, bracket 68 carrying bearing means 77 for supporting these parts on a horizontal axis, a second bearing 78 being carried by bracket 66.

Bracket 66 also supports a vertically disposed shaft 79 by means of bearings 81 and 82, the upper end of this shaft having a bevel gear 83 driven by pinion 76. A spur gear 84 is secured to the lower end of shaft 79 and meshes with a rack 85 secured to one side of horizontal cross arm 57. A plurality of ball bearing rollers 86 and 87, seen in FIGURE 8, are carried by one or more brackets 88 secured within sleeve 56 and engage the upper and lower surfaces of rack 85, thus preventing rotational movement of cross arm 57. A limit switch support 89 containing a normally closed limit switch S3 (seen in FIGURE 12) for limiting vertical movement of cross arm assembly 48 is also mounted on sleeve 56 by means of a bracket 91 between servomotor supporting bracket 66 and cross arm bearing support assembly 59, as seen in FIGURES 5 and 8. A plunger 92 is carried by limit switch support 89 and is engageable with a pair of limit switch actuating cams 93 and 94, seen best in FIGURES 1 and 2. These cams are adjustably mounted on a vertical rod 95 secured between bracket assemblies 23 and 24.

An adjustable probe assembly generally indicated at 96 is pivotally mounted at 97 to the forward end of horizontal cross arm 57. The adjustable probe assembly houses an ionization type transducer to which is connected a ball probe and stem assembly seen partially at 98 which is shielded from external influences by an aluminum shield 99, the tracing ball itself extending beyond the aluminum shield so as to approach the surface of the work 101; for example, a clay automobile model. Probe assembly 96 may be tilted about a horizontal axis through 180° and may be locked in any intermediate position, a suitable scale 102 serving as an angular reference.

The other end of horizontal cross arm 57 carries a pen holder assembly generally indicated at 103 enclosed within a housing 104. This assembly includes a spring-loaded spindle 105 carrying a standard ink replacement cartridge 106. When the transcriber is not tracing, a solenoid indicated partially at 107 may be actuated to retract the pen from the paper, as seen in FIGURE 5. When making straight line traces, locking means 108 is provided to keep the pen spindle from rotating. When describing a continuous spiral outline spindle 105, driven by a suitable belt 109 from a small electric motor 111 within housing 104 (also referred to as M1 in the electrical circuit) rotates the pin spindle.

An easel assembly generally indicated at 112 is hinged to the rear end of lower bracket assembly 23 and top bracket assembly 24 at 113 and 114 respectively, as seen in FIGURE 1, the easel assembly being swingable to a folded position as shown in dot-dash lines in FIGURE 3. Easel assembly 112 has a rectangular frame 115 to the front of which is secured a paper backing plate 116, as seen in FIGURE 9. A pair of brackets 117 and 118 are located at the upper end of plate 116 for supporting a paper roll indicated in dot-dash lines at 119 in FIGURE 9 by means of a spindle 121, seen in FIGURE 1. A smaller guide roll 122 is mounted immediately below brackets 117 and 118 for holding the paper flat against plate 116. Easel 112 is so located that the paper will receive the trace of cartridge 106. Detachable clamps (not shown) may be used to hold the lower end of the paper against plate 116. Suitable latch pins 123 and 124 may be provided for locking easel assembly 112 in its operative position, and an electronic chassis indicated at 125 may be mounted on the back of the easel assembly for housing the various electronic controls. Flexible cables, indicated partially at 126, 127 and 128, connect chassis 125 with servomotor assembly 65, penholder assembly 103, a control panel 129 and motor 44, as seen in FIGURE 1.

Control panel 129 is suspended below upper bracket assembly 24 by a member 131, as seen in FIGURE 1. Before describing the electrical circuitry of unit 11, it is believed that an understanding of the circuitry will be facilitated by a description of the controls found on control panel 129, reference being had to FIGURES 11, 12 and 13. Power switch S1 applies electrical power to the transcriber, a pilot light I1 indicating this condition. A bi-directional spring lever switch S16, referred to as the "horizontal coarse position control switch," applies a full speed signal to the horizontal servomotor 71 (M3), causing travel of horizontal cross arm 57 in either direction. In a suitable embodiment of the invention, full speed was approximately 25 inches per minute. When S16 is moved toward the "in" direction, the probe 96 moves away from unit 21 and toward work 101, whereas movement of S16 toward the "out" direction will move the probe away from the work and toward the transcriber.

Horizontal fine position control switch S15 provides a function similar to S16 except that the speed will be slower, a suitable speed being approximately 1 inch per minute. This is used principally for gap adjustment positioning.

Vertical coarse position control switch S13 is a bi-directional lever switch applying power to vertical motor 44 (M2). The speed of the vertical coarse motion is controlled by means of a speed control rheostat R23. Vertical fine position control switch S14 may operate the vertical motor at a speed approximately one-fifth that caused by S13. In a suitable embodiment of the invention, S14 becomes inoperative at speed settings below 20 on the scale shown in FIGURE 11 for R23. Below that point, S13 is slow enough for most applications.

R23 may be used to govern the speed of vertical motor M2 in conjunction with transformer T3 as described below. At its maximum setting R23 provides, in one embodiment, a vertical speed of approximately 35 inches per minute. During a trace, R23 is manipulated so as to prevent vertical speeds which might require excessive speeds of horizontal motor M3. For example, on a vertically extending contour, R23 may be set near its maximum, but as the contour approaches the horizontal, the speed setting should be reduced.

Signal zero control R61 is used to set the point about which the horizontal servo system operates. Generally speaking, this control is used to obtain a zero error signal in the servo system after the gap has been properly set as described below.

Sensing switch S11 enables the operator to perform traces of inverse contours; that is, contours in which the work intersects a horizontal line between probe element 98 and unit 21, as described below with respect to FIGURE 10. The general rule for use of this switch is that if the surface lies outside the probe, the switch is set in its "normal" position. If the work lies between the probe and the machine, the switch is set in its "inverted" position, and trace switch S12 is reversed.

Trace switch S12 determines the direction of operation of vertical axis motor M2 during automatic operation. It may be moved to either the up or the down position, and during a trace will normally be shifted when S11 is reversed.

Limit set swtich S8 and its signal I2 form a combination push button and indicator used principally as a reminder to the operator to check the settings of the upper and lower limit switch cams 93 and 94. If I2 is not illuminated, it will not be possible for the unit to trace automatically. When the positions of limit switch cams 93 and 94 satisfy the operator, he depresses S8, and I2 will come on. If, subsequent to this setting, any of the limit switches are actuated, even momentarily, it will be necessary to reset S8.

Limit override switch S7 and its signal I5 also form a combinaiton push button and indicator which is used when unit 21 advances beyond any of the set limits. In this event, the vertical and horizontal positioning controls S13, S14, S15 and S16 will become inoperative because of opening of S3, S4 or S5 and I5 will be illuminated. Subsequently, S7 must be held in the depressed position while operating the positioning controls until such time as the limit switches are no longer actuated. I5 will be illuminated when any of the limit switches are actuated.

Auto seek switch S6, when depressed, operates the horizontal servo mechanism and causes probe 96 to move in such a direction as to cause the signal voltage to approach zero. This control should not be operated unless the gap between the probe and the work has been properly adjusted, as described below. Once the gap is adjusted, S6 can be used to rapidly position the probe with respect to the work and with the desired gap.

Pen switch S2 is a three-position switch controlling the action of pen cartridge 98. In the "retract" position S2 operates solenoid 107 to hold pen 106 away from paper 119. In the "line" position S2 de-energizes solenoid 107 and releases the pen, allowing it to engage the paper. In the "circle" position, S2 energizes pen motor 111 (also referred to as M1 in FIGURE 13) to rotate the pen about an adjustable radius, resulting in a wide solid line or stripe.

Manual switch S10 is a push button used to return the machine to the manual mode or stop trace position. Indicator light I4 associated with this switch is illuminated when the machine is in the manual condition.

Auto switch S9 is a push button used to transfer the machine to the trace or automatic mode, and when so pressed, indicator I3 will be illuminated. In order for machine 21 to stay in the automatic mode when S9 is pressed, all the following conditions must be fulfilled:

(1) The limit switches S3 through S5 must be unactuated.

(2) Limit set push button S8 must have been pressed, energizing Ry3.

(3) The gap must be established by means of auto seek switch S6 so that voltmeter VM1 on panel 129 (which indicates the system error signal as described below) reads, for example, within plus or minus 2 volts.

If, during automatic operation, any one of these three conditions is violated, the machine will automatically revert to the manual mode.

The remainder of the electrical circuitry, as shown in FIGURES 12 and 13, may perhaps best be understood by a description of operation of unit 21. To set up the machine for operation, transcriber 21 is first properly installed on styling bridge 25 and switch S1 connected to a source of power such as 115 volt 60 cycle A.C. by plug PL1. S1 is moved to its "on" position, indicator I1 showing the presence of power.

After a warm-up period as controlled by delay relay Ry1, during which it is impossible to move the probe, lamp I4 associated with manual switch S10 will be illuminated, the current being traced from contact 132 of Ry2 through limit switches S3 through S5, wire 133, and contact 134 of a de-energized relay Ry4-5. This relay may be referred to as the automatic mode relay, and in its de-energized position places the machine in the manual mode.

The next step is to set the trace gap. Probe 96 may be maneuvered to approximately the desired position by means of S16 and S13. It is desirable that probe 96 be adjusted about pivot 97 to a position approximately perpendicular to the surface of work 101 for the initial gap adjustment.

Actuation of S16 will cause an error signal which is either positive or negative to be imposed on a horizontal trigger potentiometer R13. For example, if S16 is moved to the left in FIGURE 12, a positive 15 volt source will be connected through a wire 135, the closed contact 136 of Ry4-5 to R13, which controls the horizontal trigger circuit gain.

The signal is fed to a differential amplifier circuit consisting of transistors Q3 and Q4. The differential amplifier balance is controlled by a balance potentiometer R16. A dead-band control R17 controls the bias on the differential amplifier and thus determines the amount of signal necessary for the differential amplifier to operate. The outputs of the differential amplifier determine the charging rate of two timing capacitors C6 and C7. These charging timers determine the firing points of uni-junction transistors Q6 and Q7, which generate pulses that fire either silicon controlled rectifier SCR3 or SCR4, depending upon which direction is called for by the error signal. The SCR's are connected in series with M3 in a half-wave configuration so that if one SCR operates the motor, it receives a half-wave current of one polarity and thus rotates in one direction. When the other SCR operates the motor, it receives a half-wave voltage of the opposite polarity and thus rotates in the opposite direction.

A tachometer or rate generator M4 is mechanically coupled to the horizontal motor M3 and generates a voltage proportional to the speed of the horizontal motor. The voltage is fed back to the input of the trigger circuit through R14 and rate adjusting potentiometer R15. The rate adjustment provides electrical damping for the horizontal servo. Ry10-11 performs the function of reversing the polarities of both the rate generator and the horizontal motor for the inverted sensing function, as described below. The position of Ry10-11 is controlled by S11.

Shifting of S16 also performs the function of energizing Ry12, this circuit being from wire 133 through wires 137, 138 and 139, S16, wires 141 and 142, contact 143 of R4-5, wire 144, Ry12 and wire 145. When Ry12 is in its deenergized position, it disconnects M3 from its power source T2, seen in FIGURE 13, and applies a short circuit across the motor which acts as a dynamic brake; energization of Ry12 will connect the horizontal motor to its power source. Preferably, M3 and the control circuit therefor constitute a high response servomotor with half-wave bi-directional control; it will be later seen that vertical motor M2 may be a relatively low response motor but has full wave control.

The movement of S16 to the left in FIGURE 12 as described above may thus cause inward movement of the probe toward the work. Rightward movement of S16 will apply a negative 15 volt error signal to R13, and will similarly energize Ry12, causing movement of the probe away from the work. Movement of S15 to the left or right will apply a smaller error signal to R13, as determined by R32, and the probe will move more slowly for fine positioning.

S13 and S14 control coarse and fine movement respectively of M2 in either direction. The armature current for M2 is fed from adjustable transformer T3 (by means of which the maximum speed of M2 may be controlled) through wires 146 and 147 to diodes D32 and D33 and SCR1-2. Movement of S13 in an upward direction in FIGURE 12 will cause energization of Ry9, opening the motor short circuit which acts as a dynamic brake and connecting M2 to its supply circuit. The circuit for Ry9 may be traced from wire 137, wire 148, switches S13 and S14, wire 149, contact 151 of Ry4-5, wire 152, Ry9 and wire 147.

Ry8 is provided which controls the trace direction, that is, whether M2 drives the probe and pen either up or down. When S13 or S14 are moved upwardly, Ry8 will be deenergized, but when they are moved downwardly, Ry8 will be energized to reverse the direction of rotation of M2. This circuit may be traced from wire 148 through S13 or S14, through closed contact 153 of Ry4-5 and wire 154 to Ry8.

Movement of S13 will also impose an error signal on the vertical motor circuit through R24, adjustable resistor R23, amplifier Q5 and transformer T6, these elements forming part of a relaxation oscillator connected to the gates of SCR1-2. When no error signal is applied, motor M2 will operate at full speed as adjusted by T3. Unlike the error signal for the control circuit of horizontal motor M3, which may be either positive or negative, the error signal for M2 is always of the same polarity, and the power applied to M2 will be decreased in proportion to the voltage of the error signal. Being a relatively low response motor, however, M2 will tend to coast as the error signal is increased.

In a suitable embodiment, 30 volts could be applied by movement of S13, and a lesser voltage applied when S14 is moved, the current passing through R31. In either case, current will pass through closed contact 155 of Ry4-5.

The effect of R31 is to lengthen the period of the relaxation oscillator connected to SCR1-2. This will mean in effect that the period during each cycle that SCR1-2 are allowed to transmit power to the motor will be shortened, and the motor will therefore slow down. It will be later seen that when the unit is placed in the automatic mode by energization of Ry4-5, the full 30 volt signal will be applied to the relaxation oscillator through R24 and R23, but that this voltage will be effectively reduced by the magnitude of the error signal created by variations in the probe gap. This signal, passing through transistor Q2, will likewise effectively increase the period of the relaxation oscillator. In other words, M2 will operate at its maximum speed when no error signal is applied to the base of Q2 and when the 30 volt signal does not pass through R31. Placing R31 in the circuit, or applying an error signal to Q2, will decrease the vertical motor speed.

After the gap between the probe and the work has been established by the fine controls S15 and S14, preferably by the use of a feeler gauge, servo zero control R61 is adjusted until voltmeter VM1 reads zero. The error signal is derived from a transducer 156 forming part of probe assembly 96 which generates a D.C. voltage proportional to the change in capacitance between probe 98 and shield 99. Transducer 156 is of a commercially available type, such as that manufactured by the Decker Company, Bala Cynwid, Pennsylvania, and comprises a gas-filled envelope supplied by a source 157 of radio frequency energy; FIG- URE 12 shows the transducer only schematically and is not intended to illustrate the complete circuit.

Probe 98 is connected to an element 158 disposed within the gas-filled envelope between elements 159 and 161 across which the radio frequency is applied. Shield 99 is connected to ground, and an adjustable internal capacitor 162 is connected between ground and an element 163 disposed within the gas-filled envelope between elements 159 and 161. This capacitor is adjusted to the same capacitance value that exists between the probe and its shield when the probe is a predetermined distance from the surface of work 101. The workpiece may, for example, be clay, and the predetermined distance could, for instance, be 0.007 inch.

The probe output voltage is measured across elements 158 and 163, and will be zero when the spacing of probe 98 from workpiece 101 corresponds to the setting of capacitor 162. The voltage output of the probe is a differential signal and is fed to a differential cathode follower VT3 which in turn is connected to a differential operational amplifier A1, the output of which is connected to an emitter follower amplifier Q1. VT3 acts as an impedance transformer converting the output impedance from, for example, 1 megohm, the output impedance of the probe, to roughly 1500 ohms. A1 is used as a very high gain voltage amplifier, and servo zero potentiometer R61 acts as a balance control for the differential cathode follower and amplifier. A differential gain control R42 determines the gain of the differential operational amplifier and could be set, for example, to give a voltage gain of approximately 5,000.

The output of the differential amplifier is single ended and the voltage could vary, under illustrative conditions, between plus 10 and minus 10 volts, these figures representing the saturated conditions.

The output of Q1 is the system signal error, its value being indicated by an ohmmeter VM1. During warm-up time, VM1 is by-passed by Ry2.

After R61 has been adjusted, the gap has been established and the probe can be moved from the work. The vertical axis limit switch actuators 93 and 94 will now be set, and having been set, the unit is moved off the limits and the limit set button S8 is operated, illuminating I2 and energizing Ry3. This is a self-locking relay which will apply power through a wire 164 to one side of automatic mode switch S9, thus fulfilling one of the conditions described above for placing the machine in the automatic mode.

The probe should now be moved vertically to the point where the tracing will start, this being done by S13 and S14. The operator then presses auto seek button S6. This will cause energization by Ry13, power being supplied from the previously mentioned wire 164.

Energization of Ry13 will apply power from wire 137 through wire 144 to Ry12, connecting horizontal motor M3 to its power supply circuit. Ry13 will also close contacts connecting the error signal from Q1 to R13, this circuit being traced from Q1 through wires 165, 166, and 167. M3 will therefore drive the probe toward or away from the work, depending upon the direction called for by the error signal as described above, and the probe will stop at the exact spacing as previously selected.

The operator then establishes the direction of trace by placing trace switch S12 in either its up or down position. This is in preparation for transfer of the unit to the automatic mode by energization of automatic mode Ry4–5. If the trace is to be in a downward direction, Ry8 will be energized, whereas when the trace is upward, Ry8 will be deenergized.

At this time sense switch S11 will also be set to either its inverted or normal position. Although the functioning of this switch will be described in further detail below, it may presently be stated that when the surface to be traced lies beyond the probe, S11 should be placed in its normal position, thereby energizing Ry10–11. This will result in the probe being pulled away from the work and toward the machine when the gap becomes too narrow, and vice versa. If a portion of the contour being traced is disposed between the probe and the machine, the sense switch would be placed in its "inverted" position. The vertical motor speed is then set by T3 and the mode of pen operation selected (either a line or a circle) by S2.

The operator may then place the unit in automatic operation by pressing auto button S9. During the trace, the operator should monitor the vertical speed and manipulate T3 in such a manner as to avoid excessive speed of the horizontal motor M3. If the unit reverts to the manual mode, for reasons discussed below, the operator should then reduce the speed, press auto seek button S6 to reset the gap, and then push auto button S9 again. The unit will then continue to trace.

Actuation of S9 will cause energization of Ry4–5, and a locking circuit for this relay will be closed as follows: From wire 133 through contact 168 of Ry4–5, S10, the contacts of Ry6 and Ry13, and wire 169. I4 will be extinguished by opening of contact 134 and I3 will be illuminated to indicate that the unit is in the automatic mode. S16 and S15 will be disenabled by opening of contact 136, and closing of contact 171 will cause the error signal from wire 165 to be applied to R13. Opening of contact 151 will disenable S13 and S14, and closure of contact 172 will cause energization of Ry9 through the following circuit: From wire 137 through wires 148 and 173, the contacts of Ry7, wire 174, contact 172 and wire 152 to Ry9 and thence to wire 147. This will connect the vertical motor M2 to its power circuit.

Opening of contact 153 likewise disenables S13 and S14, and closure of contact 175 will place S12 in the circuit, so that the trace direction may be selected. If S12 is placed in the down position, Ry8 will be energized, whereas in the up position it will be deenergized.

Opening of contact 143 further disenables S16 and S15, and closure of contact 176 will energize Ry12, thus connecting horizontal motor M3 to its power circuit through wire 144. Opening of contact 155 disconnects S13 and S14 from the circuit which applies voltage to the relaxation oscillator for the vertical motor control, and closure of contact 177 will cause this voltage to be connected directly to the relaxation oscillator through wire 178 and R24.

There are several differences between the circuit positions which result from pressing the auto seek button S6 and the auto button S9. Actuation of S6 will not enable the vertical motor control system, since Ry9 will not be energized, whereas actuation of S9 will enable the vertical motor M2. Furthermore, the circuit for energizing Ry9 passes through the contacts of brake relay Ry7 which, as will be later seen, may cause momentary stopping of M2 if the error signal from Q1 increases beyond a predetermined value.

Another condition which exists after S9 is actuated, but is not present when S6 is actuated, is the fact that there is a closed locking circuit for Ry4–5 and that this circuit passes through the contacts of alarm relay Ry6 and auto seek relay Ry13. That is, if either of these relays should be actuated while the unit is in the automatic mode, Ry4–5 will be de-energized and the machine will be returned to the manual mode. As will be later seen, Ry6 is set to be energized when the error signal from Q1 increases beyond a predetermined value, greater than that which would actuate Ry7. Actuation of Ry13 by auto seek switch S6 will likewise return the machine to the manual mode. The locking circuit for Ry4–5 also passes through manual switch S10, so that the machine may be returned to the manual mode by pressing this switch.

After S9 has been pressed, the machine will begin to trace the contour of workpiece 101. Assuming, for example, that trace switch S12 is in the down position and sense switch S11 is in the normal position, M2 will drive horizontal cross arm assembly 48 downwardly, M2 rotating at its maximum speed as set by T3 by virtue of the fact that maximum voltage is being applied to the vertical motor relaxation oscillator.

Assuming that a portion of the workpiece contour is as shown in FIGURE 12, downward vertical movement of probe 98 will momentarily decrease the gap between the probe and the workpiece, and the resulting error signal delivered from Q1 to R13 will operate the differential amplifier for horizontal motor M3. The motor will be driven, at a speed dependent upon the value of the error signal, in a direction causing cross arm 57 to move away from workpiece 101. The resulting increase in gap to its normal value will reduce the error signal to zero, and M3 will stop.

As long as the contour changes are sufficiently gradual, the error signal from Q1 will not exceed that which causes M3 to be driven at its maximum speed. In fact, because of the high response characteristics of M3, the error signal will, under these conditions, be held to small values, and vertical motor M2 will continue to be driven at substantially its maximum speed.

Means are provided, however, for decreasing the power applied to M2, and thus slowing it down, in proportion to the absolute magnitude of the error signal applied to the M3 control circuit. This means includes a connection from the Q1 error signal to the relaxation oscillator which controls the M2 power circuit, the connection being such that the Q1 error signal will modify or reduce the full voltage normally applied to the relaxation oscillator.

Since the vertical motor is uni-directionally controlled by S1, that is, it travels either up or down, the error signal from Q1 is converted to an absolute value signal for application to the vertical motor relaxation oscillator. The error signal is passed from wire 167 through wire 179 to transistor Q9 and the primary center tap of transformer T7. The primary of this transformer is connected to the output of diode bridge D26 through D29 supplied by 90 volts A.C. This converts the signal into an alternating current signal the amplitude of which is proportional to the amplitude of the D.C. signal, but the phase of which is dependent upon the polarity of the D.C. signal; that is, when the D.C. error signal reverses there will be a phase reversal of the A.C.

The A.C. signal is then full-wave rectified to a D.C. signal fed to Q8, this being done by diodes D30–31 connected between the secondary of transformer T7 and the base of Q8, the center of T7 secondary being grounded and a capacitor C10 being connected between the base of Q8 and ground. This D.C. signal is proportional to the input error signal at Q9 but independent of its polarity.

The fully rectified D.C. signal applied to the base of transistor Q8 is amplified and applied to the base of Q2, the latter being in turn connected to the relaxation oscillator.

The circuit arrangement is such that an increase in amplitude of the error signal will increase the period of the relaxation oscillator, resulting in decreased power being supplied to vertical motor M2, and the latter will slow down. The degree of decrease in power supplied to M2 will be proportional to the magnitude of the error signal. Horizontal motor M3 will thus be able to maintain the proper gap between probe 98 and the surface of work 101.

Should a sudden change in contour occur, the increase in the error signal may alone be insufficient to slow down or stop M2 quickly enough to prevent a continued change in the gap between the probe and workpiece. Brake relay Ry7 is provided to momentarily and rapidly stop M2 in such an event. Ry7 is connected to the error signal by means of wire 166 and brake potentiometer R46. R46 is adjustable to determine the point at which Ry7 will become energized. If, for example, the saturated conditions for error signal voltage variation are between plus 10 and minus 10 volts, R46 may be set to cause Ry7 to trip at plus or minus 4 volts. Tripping of Ry7 will cause deenergization of Ry9, disconnecting M2 from its power source and applying a short circuit across the motor which acts as a dynamic brake. Vertical movement of probe assembly 96 will therefore stop until M3 has readjusted the gap sufficiently to reduce the error signal below plus or minus 4 volts, permitting Ry7 to become deenergized. This will again energize Ry9 to reconnect the vertical motor to its power supply.

The parameters of the system may be so adjusted that the magnitude of error signal which is sufficient to energize Ry7 will be approximately the same as that which, if continuously applied to Q9, would entirely cut off the power supply to M2. With this arrangement, a gradual building up of the error signal will slow down or stop M2 without energization of Ry7, but if there is a sudden contour change, Ry7 will be energized. The arrangement thus takes into account the inertia inherent in M2.

Alarm relay Ry6 is responsive to the presence of an even higher error signal to open the locking circuit for automatic mode relay Ry4–5, returning the unit to manual mode. Ry6 is connected to the error signal in wire 166 through an alarm potentiometer R12. This potentiometer is set to permit energization of Ry6 only at an error signal magnitude higher than that which would energize Ry7. If, for example, Ry7 is set to trip at plus or minus 4 volts, Ry6 may be set to energize at plus or minus 6 volts. Once Ry4–5 is deenergized, whether it be by opening of one of the limit switches S3 through S5, actuation of S10, energization of Ry6 or energization of auto seek relay Ry13, the unit may be returned to the automatic mode only by depression of S9 and fulfillment of the other conditions described above, namely, opening of the limit switches, depression of limit set switch S8, and establishment of the proper gap between the probe and the work.

FIGURE 10 illustrates schematically a workpiece 101 having a surface contour portion disposed outwardly of probe assembly 96, a second surface contour portion B between probe assembly 96 and unit 21, and a third section C which again is disposed outwardly of probe assembly 96. To trace this contour in a continuous manner, assuming the trace is in a downward direction, during tracing of section A trace switch S12 will be placed in the down position and sense switch S11 in its normal position. When the lowest point of the contour between sections A and B is reached, the machine will stop automatically by energization of alarm relay Ry6, since the gap will be decreased sufficiently to increase the error signal beyond that needed to energize Ry6.

Trace switch S11 will then be placed in the "up" position, deenergizing Ry8 so that vertical motor M2 will drive probe assembly 96 upwardly when it rotates. Sense switch S11 will be moved to the "inverted" position, deenergizing Ry10–11 and thus reversing the connections between horizontal motor M3 and its power supply. After resetting the gap by pressing auto seek button S6, the unit may be returned to the automatic mode by pressing S9. This will cause contour portion B to be traced, since the effect of the positive and negative error signals on M3 will be the opposite of those occurring with S11 in its normal position. When the juncture of contour sections B and C is reached, the unit will again revert to the manual mode because of energization of Ry6, and S12 and S11 may be returned to their original positions to continue the trace.

FIGURE 14 illustrates a preferred manner of supporting probe 98 within shield 99. The shield has a conical form, a suitable included angle therefor being about 20°, and the base 181 of the shield is mounted on one end of the housing containing transducer 156. A terminal 182 extends from this end of the transducer and is connected to element 158 therein. A conductive rod 183 has an enlarged end 184 secured to terminal 182, the outer end 185 of this rod being of reduced diameter and carrying probe 98 which is of spherical shape. A sleeve 186 of a suitable insulative material such as Teflon is mounted on rod portion 185, the outer end of this sleeve being disposed within and supported by the outer end of shield 99, with probe 98 being disposed immediately outwardly of the sleeve. It has been found that with this construction there is a minimum of vibrational or other unwanted movement of probe 98 with respect to shield 99 which might otherwise affect the accuracy of the unit.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

In a non-contact contour tracer, a vertical column, a lead screw on said vertical column, a vertical motor for continuously rotating said lead screw, a horizontal cross arm assembly comprising a support slidably mounted on said vertical column and threadably connected to said lead screw, a cross arm supported for horizontal movement by said support, a servomotor on said horizontal cross arm assembly operably connected to said cross arm, a probe assembly carried by one end of said cross arm, said probe assembly comprising a transducer having a terminal extending from one end thereof, an electrically conductive rod secured to and extending from said terminal, a spherical probe secured to the outer end of said rod, a conical shield having its wider end secured to said transducer and its narrow end terminating inwardly of said probe, and an electrically insulative sleeve on said rod and disposed within the narrow end of said shield, means responsive to variations in the gap between said probe assembly and the surface of an adjacent workpiece to cause the servomotor to shift said cross arm so as to maintain said gap as a constant value, and tracing means carried by the other end of said cross arm.

References Cited by the Examiner
UNITED STATES PATENTS

| | | | |
|---|---|---|---|
| 2,511,956 | 6/50 | Wetzel | 318—162 X |
| 2,828,673 | 4/58 | Campbell | 33—23 X |
| 2,868,087 | 1/59 | Morgan | 33—23 X |
| 2,935,681 | 5/60 | Anderson | 33—174 X |
| 3,004,166 | 10/61 | Greene | 318—162 X |
| 3,017,552 | 1/62 | Brouwer | 318—162 X |
| 3,032,881 | 5/62 | Fengler | 33—23 |
| 3,055,114 | 9/62 | De Boer et al. | 33—23 |
| 3,130,497 | 4/64 | Colten | 33—23 |

ISAAC LISANN, *Primary Examiner.*